US00RE34787E

United States Patent [19]

Westhoff et al.

[11] E Patent Number: Re. 34,787

[45] Reissued Date of Patent: Nov. 15, 1994

[54] BIDIRECTIONAL GASKET HAVING WATER ENERGIZING POCKETS

[75] Inventors: James A. Westhoff, Langhorne; James A. Kelly, Warrington, both of Pa.

[73] Assignee: Poly-Tec Products, Inc., Tullytown, Pa.

[21] Appl. No.: 94,694

[22] Filed: Jul. 21, 1993

Related U.S. Patent Documents

Reissue of:

[64] Patent No.: 5,217,237
Issued: Jun. 8, 1993
Appl. No.: 825,135
Filed: Jan. 24, 1992

[51] Int. Cl.[5] ..... F16J 15/10

[52] U.S. Cl. ..... 277/207 A; 277/27; 277/186; 277/189; 285/110; 285/230

[58] Field of Search ..... 277/27, 186, 189, 207 A, 277/181, 207 R, 211, 215, 226; 285/95, 110, 345, 346, 230

[56] References Cited

U.S. PATENT DOCUMENTS

| | | | |
|---|---|---|---|
| 2,809,853 | 10/1957 | Nathan | 277/207 A |
| 2,888,281 | 5/1959 | Ratti | 277/206 A |
| 3,832,438 | 8/1974 | Ditcher | 285/230 X |
| 4,014,556 | 3/1977 | Anderson | 277/207 A X |
| 4,097,076 | 6/1978 | Wackenreuther et al. | 277/207 A X |
| 4,159,829 | 7/1979 | Ditcher | 277/207 A X |
| 4,318,547 | 3/1982 | Ericson | 285/110 X |
| 4,333,662 | 6/1982 | Jones | 285/230 X |
| 4,508,355 | 4/1985 | Ditcher | 277/207 A X |
| 4,693,483 | 9/1987 | Valls | 277/207 A |
| 5,114,162 | 5/1992 | Ditcher | 285/110 X |

FOREIGN PATENT DOCUMENTS

| | | | |
|---|---|---|---|
| 0215745 | 6/1961 | Austria | 285/110 |
| 0090934 | 10/1983 | European Pat. Off. | 285/110 |
| 1373279 | 8/1964 | France | 277/211 |
| 1545368 | 11/1968 | France | 277/207 A |
| 3803729 | 8/1989 | Germany | 277/207 A |

*Primary Examiner*—Scott W. Cummings
*Attorney, Agent, or Firm*—Louis Weinstein

[57] ABSTRACT

A bidirectional gasket providing a water-tight seal between an opening in a manhole assembly and a pipe extending into said opening, comprises a T-shaped anchoring portion for embodiment in a manhole opening. A substantially A-shaped pipe engagement portion is joined to the anchoring portion by a slender connecting web facilitating bending of the gasket. The A-shaped portion has "legs" and recesses which form water pockets preventing water from entering. The durometer of the gasket material enhances the water-tight seal of the legs with increasing water pressure. The pipe engaging portion accommodates a greater outside pipe diameter compared with conventional connectors due to reduced volume, by providing voids within the connector together and a lower durometer of gasket material. The gasket has enhanced ability to accommodate diameter deflection or ovation in rigid and flexible pipe materials. The A-shaped profile allows for greater angular deflection and/or pipe misalignment compared with conventional connectors. The gasket apex has a recess to locate the voids which, in addition to enhancing mechanical softness of the gasket, also provides the ability to increase gasket compression by introducing a liquid filler into the voids. Tapered projections near the apex wipe the external periphery of a pipe upon insertion and also contribute to the compression of the nose portion of the connector. The gasket may be molded or formed from an elongated extrusion joined at its ends to form an annular gasket.

13 Claims, 2 Drawing Sheets

BIDIRECTIONAL GASKET HAVING WATER ENERGIZING POCKETS

Matter enclosed in heavy brackets [ ] appears in the original patent but forms no part of this reissue specification; matter printed in italics indicates the additions made by reissue.

FIELD OF THE INVENTION

The present invention relates to gaskets for providing a water-tight seal between a manhole opening and a pipe extending into said opening and more particularly to a novel bidirectional gasket having self-energizing water pockets which enhance the water-tight seal provided by the gasket whereby the sealing pressure increases with increasing water pressure and wherein the gasket design is capable of accepting pipe diameters over a wider tolerance than conventional gaskets.

BACKGROUND OF THE INVENTION

Rubber connectors are typically utilized to provide a water-tight seal between an opening in a manhole assembly and a pipe extending into the opening. U.S. Pat. No. 4,159,829 assigned to the assignee of the present invention discloses a conventional bidirectional connector formed from an extrusion having a hollow, pear-shaped head portion integrally joined to a T-shaped anchoring flange. The extrusion is cut to length and curled to form a substantially right cylinder configuration with the mating edges being joined. The pear-shaped portion deflects from a radially inward orientation upon insertion of a pipe. A single cavity extends through the head portion to provide the head portion with added resiliency and provides moderate sealing pressure. U.S. Pat. No. 4,508,355 assigned to the assignee of the present invention constitutes an improvement over U.S. Pat. No. 4,159,829 by providing a gasket of similar shape having a plurality of internal cavities extending longitudinally through the head portion to provide the desired resiliency while at the same time providing improved stability of gasket configuration which yields a stronger and more uniform seal around the exterior of the sewer pipe including portions of the surface which may be significantly out-of-round.

The above designs nevertheless have the disadvantages of providing a water-tight seal which weakens as the water pressure applied to the gasket increases and which has very narrow tolerance limits with regard to the range of pipe outer diameter which can be accepted by a gasket thereby greatly increasing the number of gaskets required to cover a large range of pipe outer diameters, typically from 4" to 84".

BRIEF DESCRIPTION OF THE INVENTION

The present invention is characterized by comprising a bidirectional gasket which retains all of the advantages of gaskets of like design, as were described hereinabove, for example, and which overcomes the above mentioned disadvantages as well as provided other advantages not found in such conventional gaskets. The gasket of the present invention is characterized by comprising a T-shaped anchoring portion and a substantially A-shaped or pear-shaped pipe engaging portion similar to those found in conventional gaskets, as described hereinabove, for example. As a departure from conventional design, the A-shaped portion is provided with recess near its wide end which defines a pair of legs the extend away from the head portion and act as water seal flaps. The wide end of the A-shaped portion is joined to the anchoring portion by an integral connecting web having a thickness which is significantly reduced relative to the thickness of the adjacent anchoring portion the connecting web greatly facilitating bending of the connecting web and hence the gasket.

The connecting web cooperates with the legs and recess in the A-shaped portion to form a pair of water pockets, one of which becomes active dependent upon the direction in which the gasket is deflected, to provide a water-tight seal which increases an effectiveness with the increasing water pressure imposed upon the gasket. The legs also provide significantly greater body contact between the gasket and the pipe, further enhancing the water-tight seal.

The flexibility and compressibility of the gasket are increased through the use of voids in the head portion of the gasket. The gasket material has a durometer comparable with conventional gaskets of similar design, the durometer of the gasket also contributing to the effectiveness of the "water pocket".

The bendability, flexibility and compressibility of the gasket, in addition to providing a good water-tight seal, also permit the gasket to accommodate a wider tolerance range of pipe diameters.

The weight of the gasket is further reduced and the compressibility is thus further enhanced by the continuous openings or voids extending around the gasket and arranged within the A-shaped portion of the gasket, which voids are capable of being filled with a suitable liquid, in situations requiring reduced compressibility.

The tip of apex of the A-shaped portion is provided with a centering groove which serves to positively locate the internal voids, thereby serving as the means for guiding insertion of a hypodermic-type injection needle for penetration into the hollow region and insertion of a suitable liquid for increasing gasket volume and reducing compressibility.

A coupling web increases the gasket flexibility to such an extent that the gasket, in addition to providing a wider tolerance range for pipe diameter, provides an effective water-tight seal for pipes whose longitudinal axes are offset from desired alignment by an offset angle of as much as 15° as compared with a maximum offset angle of 10° obtainable when employing conventional gaskets of similar design.

In addition, integral tapered projections provided near the narrow tip of the A-shaped portion serve as "wipers" which wipe lubricant applied to the external periphery of the pipe to facilitate coupling with the pipe, the wiping action further enhancing the pipe/connector seal. The projection performing the wiping action is ultimately compressed against the surface of the pipe.

OBJECTS OF THE INVENTION

It is therefore one object of the present invention to provide a novel bidirectional gasket for providing water-tight gasket/pipe seal which is superior to that of conventional gaskets of similar design and which is accomplished in a gasket of reduced volume and weight.

Another object of the present invention is to provide a novel bidirectional gasket having water pockets designed to enhance the effectiveness of the water-tight seal with increasing water pressure imposed upon the gasket.

Another object of the present invention is to provide a novel bidirectional gasket having increased flexibility as compared with conventional gaskets of similar design through the employment of a connecting web of significantly reduced thickness arranged between and integrally joined with a T-shaped anchoring portion and an A-shaped pipe engaging portion.

Still another object of the present invention is to provide a novel bidirectional gasket for providing an enhanced gasket/pipe seal and comprising a substantially A-shaped pipe engaging portion whose narrow end is provided with integral wiping projections for wiping lubricant from the pipe as it is inserted to further enhance the water-tight seal provided by the gasket.

Yet another object of the present invention is to provide a gasket providing a water-tight seal between a pipe and an opening in a barrier wall, said gasket having a head portion engaging the pipe and provided with extending legs which significantly increase the contact area between the gasket and the pipe to further enhance the water-tight seal.

BRIEF DESCRIPTION OF THE FIGURES

The above as well as other objects of the present invention will become apparent from reading the accompanying description and drawings in which.

DETAILED DESCRIPTION OF THE INVENTION

Figure 2:
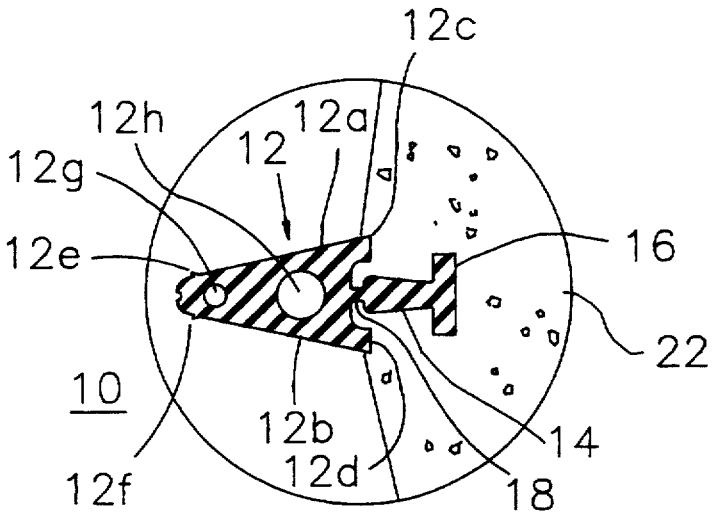
FIG. 2 shows a detailed sectional view of the gasket of FIG. 1 in the position occupied by the gasket before insertion of a pipe.
Figure 1:
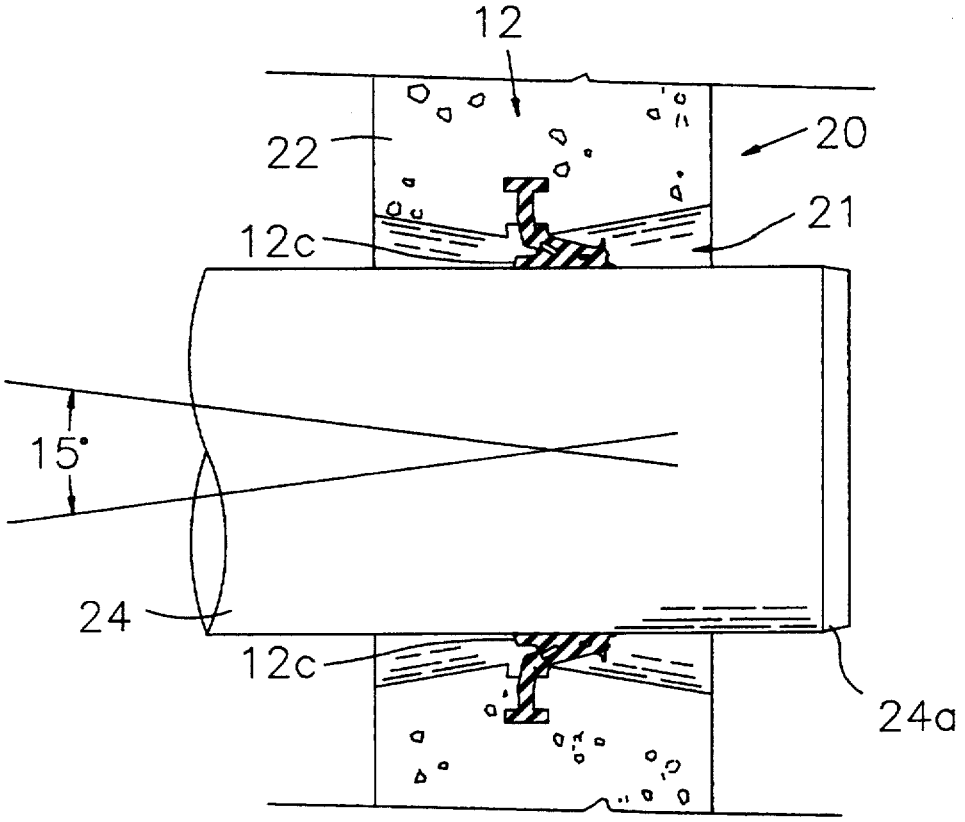
FIG. 1 shows a sectional view of a gasket embodying the principles of the present invention and in which a pipe has been inserted.

Making reference to FIGS. 1 and 2, the gasket 10 of the present invention is preferably formed from a continuous extrusion of a suitable synthetic elastomeric material.

Figure 4:
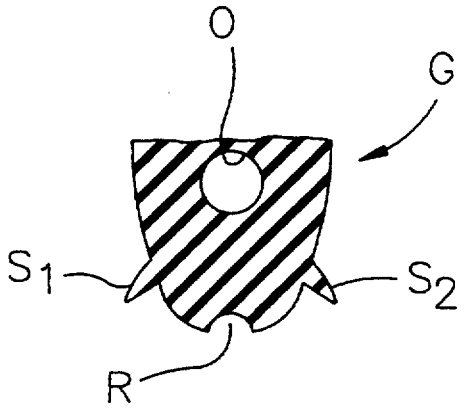
FIG. 4 shows a detailed view of the tip portion of the gasket.

The extrusion shown in cross-section, is comprised of an A-shaped head portion provided with a recess R at the apex or tip of its narrow end, as shown in FIG. 4. Tapered sides 12a and 12b terminate in a pair of legs 12c and 12d at the wide end of the head portion opposite recess R.

The pair of integral projections 12e and 12f arranged on opposite sides of the recess R serve as wiping members for wiping lubricant from an inserted pipe, as will be more fully described.

The gasket is formed of a suitable rubber or rubber-like material selected to provide a gasket having a durometer of the order of 50–55 which is comparable to conventional gaskets, for example, those gaskets of the type described in the aforementioned '355 and '829 patents.

The volume, weight and compressibility of head portion 12 is further reduced through the provision of cavities 12g and 12h which are preferably symmetrically located with resepct to the aid of symmetry S-S' of the cross-section of head portion 12, axis S-S' extending perpendicular to the axis of cavities 12g and 12h and extending through the mid-line of the anchoring portion and connecting web as will be more fully described below. The cavities 12g and 12h are substantially continuous around the gasket.

Cavities 12g and 12h are preferably of different diameters, cavity 12h being larger than cavity 12g. The size and location of the cavities, in addition to reducing the material present in the gasket to provide the desired resilience, nevertheless provide lateral stability to the structure which assures the maintenance of configurational integrity, causing the desired function of the gasket to be retained despite the large forces exerted upon the gasket by the pipe inserted therethrough.

The gasket is further comprised of a T-shaped anchoring portion which includes a neck portion 14 and an integral foot portion 16 which are adapted to be embedded into the cast material 22.

The A-shaped portion 12 is joined to neck portion 14 by an integral connecting web 18 integrally joined to the wide end of head portion 12 and the end of neck portion 13 remote from foot portion 16. Web 18 has a thickness which is significantly reduced as compared with the thickness of neck portion 14 to provide enhanced flexibility and bendability of the gasket as will be more fully described.

Figure 2A:
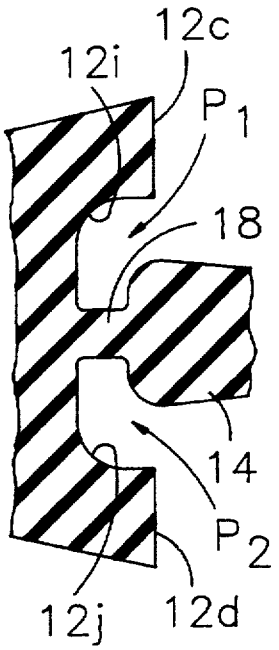
FIG. 2a shows an enlarged sectional view of the water pockets provided in the gasket as shown in FIG. 2.

The wide end of A-shaped portion 12 is provided with a pair of curved recesses 12i, 12j shown in greater detail in FIG. 2a which, together with connecting web 18 and legs 12c and 12d form a pair of self-energizing water pockets P1, P2 which serve to increase the effectiveness of the water-tight seal as the water pressure applied to the gasket increases, as will be described more fully hereinbelow.

In order to form a gasket of the desired size and diameter, the extrusion is cut to a proper length and is formed into a circle with the free ends of the gasket being bonded together to provide a ring-like gasket. The joining and bonding techniques utilized for forming the ring-like gasket are conventional and may incorporate the techniques described in the aforementioned '355 and '829 whose descriptions are incorporated herein by reference thereto.

Although the gasket of the present invention lends itself readily to formation through the employment of an extrusion technique, it is possible to mold the gasket, if desired.

The gasket is preferably embedded within a manhole assembly, for example, by the use of conventional positioning rings, the aforementioned method and apparatus being described in the above-identified '829 patent with particular reference being made to FIGS. 6 and 7 and the descriptive portions related thereto.

FIG. 1 shows the gasket 10 of the present invention installed in opening 21 in sidewall 20 which may, for example, be the sidewall of a manhole assembly and more particularly, a manhole base cast, for example, from a suitable material such as concrete.

FIG. 2 shows a detailed sectional view of the gasket in cast material 22 and in the undeflected position normally assumed prior to insertion of a pipe.

FIG. 1 shows the manner in which pipe 24 is inserted within opening 21. Pipe 24 preferably, although not necessarily, is provided with a tapered right-hand end 24a which facilitates insertion of the pipe into the opening and the gasket. The outer periphery of pipe 24 is also preferably coated with a lubricant to further facilitate entry of the pipe into the gasket.

FIG. 1 shows the pipe after insertion, the pipe originally being moved from left to right, causing the gasket to undergo bending from the undeflected position shown in FIG. 2 to the deflected position shown in FIG. 1. The projection 12g permits easier coupling by allowing the lubricant to remain in the immediate area where the gasket and pipe surface meet. This ensures that the proper amount of lubricant remains present to prevent tearing or frictional wear of the gasket profile during coupling. When the coupling action is completed, the lubricant typically used in pipeline construction will actually create a frictional bond between the gasket and pipe surface as the lubricant disperses. In addition, the projection 12g is compressed between the main body 12a of the gasket and the pipe when the pipe is moved to its final position.

The bending of the gasket serves to urge the legs 12c against pipe 24 to significantly increase the surface area contact between the gasket and the pipe, especially when compared with the gaskets disclosed in the '829 and '355 patents.

Figure 3:
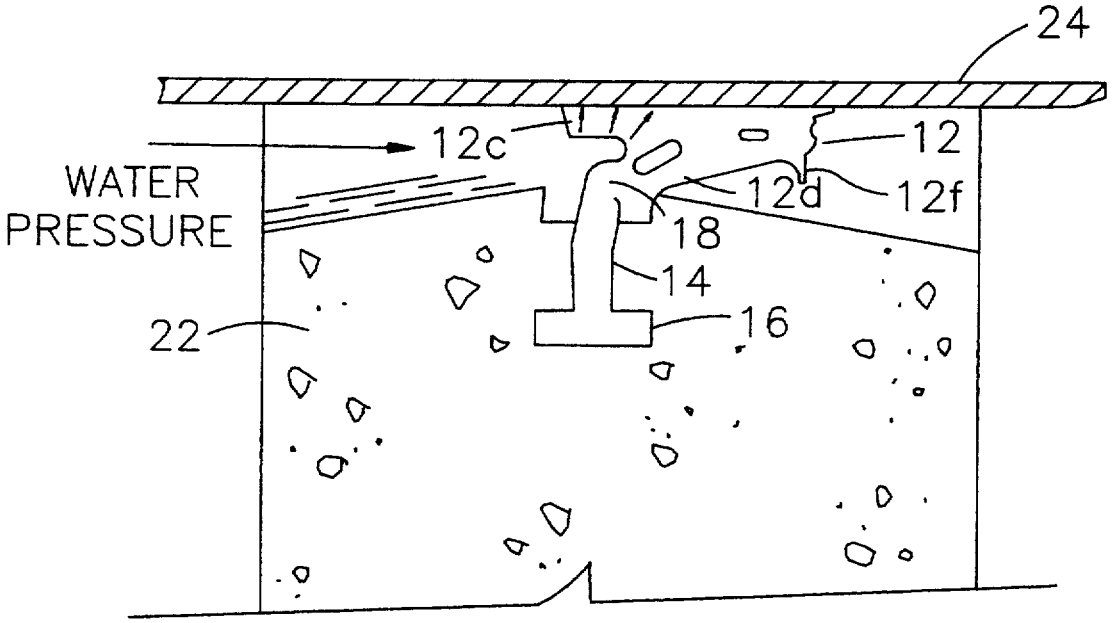
FIG. 3 shows a sectional view of the gasket which is useful in explaining the effectiveness of the pipe/gasket seal provided by the water pocket.

Self energized water pocket P1, in addition to blocking water from passing from the external side of sidewall 20 between the gasket and the pipe, further provides a self-energizing function wherein the build-up of water pressure within pocket P1 applies an increasing force upon head 12 and leg 12c, as shown in FIG. 3 causing the head 12 and especially leg 12c to apply increasing pressure upon the surface of pipe 24, with the result that the greater the water pressure, the better the seal between the gasket 10 and pipe 24. The increased surface contact between gasket and pipe due principally to the legs 12c, 12d also contributes significantly to the effectiveness of the water-tight seal. Also the likelihood that an imperfection in the pipe surface will create or cause a failure is greatly reduced.

Employing a gasket material having a durometer of the order of 50–55 increases the compressibility of the gasket, enabling the gasket to deflect from the undeflected position to that of FIG. 2 to that shown in FIG. 1 and further enables the gasket flange 12c, for example, to experience compression due to the build-up of water pressure within the self-energizing pocket P1. The durometer of the gasket, coupled with the voids 12g and 12h, enables the gasket to accommodate a pipe diameter tolerance range which is significantly greater than that of conventional gaskets of similar design due to the reduction in physical volume and rubber durometer. In addition, the gasket flexibility accommodates diameter deflection and/or ovation in flexible pipe materials.

The profile of gasket 10 also accommodates greater angular deflection and/or pipe misalignment as compared with conventional gaskets. FIG. 1 shows the angle $\alpha$ of deflection which may be as much as 15° deviation from the desired longitudinal axis while maintaining a good water-tight seal. This compares very favorably with conventional gaskets of similar design which provide a maximum deviation of 10°.

The legs 12c, 12d extend well beyond the head portion 12 and extend to the opening 21 in wall 22 and preferably extend partially into annular recesses in opening 21 as shown in FIG. 2. The leg 12c snaps away from the position shown in FIG. 2 upon deflection of the gasket. The penetration of the legs into opening 21 is chosen to maximize the length of legs 12c, 12d while preventing the legs from being locked in to the cast material and this prevented from engaging pipe 24.

The coupling pressure of the gasket (in the absence of water pressure in a water pocket) is comparable to conventional gaskets of similar design due to the rubber durometer and overall volume while at the same time providing a good water-tight seal which increases in effectiveness due to the self-energizing water pocket design described hereinabove.

The gasket of the present invention provides superior sealing capabilities as compared with conventional gaskets of similar design while being of reduced size and weight thus significantly reducing the cost of materials and hence the cost of production. The gasket design, size, volume and durometer further enable the gasket to acclimate a wider tolerance of pipe diameter, enabling, for example, gaskets of four cross-sectional sizes to cover a complete range of pipe sizes from 4 inches to 84 inches diameter pipe, as well as accommodating both rigid and flexible pipe.

A latitude of modification, change and substitution is intended in the foregoing disclosure, and in some instances, some features of the invention will be employed without a corresponding use of other features. Accordingly, it is appropriate that the appended claims be construed broadly and in a manner consistent with the spirit and scope of the invention herein described.

What is claimed is:

1. A bidirectional annular gasket for providing a water-tight seal between an opening in a barrier wall and a pipe inserted into said opening, said gasket comprising a ring of elastomeric material having a substantially uniform cross-section along its circumferential length, said cross-section comprising a T-shaped anchoring portion including a radially-outwardly directed foot portion and a neck portion integral with said foot portion and extending at right angles and radially inward therefrom to form said T-shaped anchoring portion and a head portion extending radially inward of said foot portion for engagement with the exterior of said pipe;

said head portion having a substantially A-shaped configuration defined by a wide end tapering to a narrow tip, with the wide end of said A-shaped configuration being positioned adjacent said anchoring portion and a narrow tip forming an apex of said head portion and, prior to insertion of a pipe, extending radially inwardly from and being remote from said anchoring portion;

the head portion, prior to insertion of a pipe, being substantially symmetrical about a plane passing through the center of the head portion and aligned with said radial direction;

the wide end of said head portion being provided with a recess defining a pair of legs extending diagonally outward and away from the main body of said head portion;

a connecting web joining said A-shaped configuration and said anchoring portion and being integrally joined at a first end to the wide end of said A-shaped configuration substantially at midpoint of said recess and at a second end to a radially inward end of said neck portion; and said connecting web dividing said recess into a pair of pockets on opposite sides of said web.

2. The gasket of claim 1 wherein the thickness of said connecting web, measured in a direction perpendicular to said plane, is less than the thickness of said neck portion measured in said perpendicular direction to facilitate flexing and bending of said connecting web upon insertion of a pipe into said gasket when the diameter of the pipe is greater than the diameter defined by the apex of said gasket head portion causing said gasket to bend in a region of said connecting web.

3. The gasket of claim 1 wherein *said head portion is provided with first and second cavities each of substantially circular cross-section and spaced from one another in a radial direction to define a wall between said cavities transverse to said plane, each of said cavities extending substantially continuously about the circumference of the gasket and* said A-shaped portion is further provided with a recess at the tip of said A-shaped portion to facilitate location of said cavities and to facilitate insertion of a hypodermic-type needle for insertion of a liquid material into at least one of said cavities to alter [the] compressibility of the gasket.

4. A bidirectional gasket for use in forming a fluid-tight seal between a pipe and an opening in a barrier wall through which said pipe passes, comprising:

an annular member of elastomeric material having a tubular head portion of a substantially A-shaped cross-section defined by a wide end and having tapering sides tapering to a narrow tip and a foot portion comprising a base flange portion and a neck portion of substantial thickness integrally joined to a mid-region of said base flange portion to form a substantially T-shaped anchoring portion for embodiment within a cast material forming said barrier wall;

said head portion tapering sides being substantially symmetrical about a plane passing through a longitudinal axis of the said A-shaped portion;

a connecting web extending between said neck portion of said foot portion and the wide end of said A-shaped head portion;

said A-shaped head portion having [a plurality of] recesses at the wide end thereof *and arranged* on opposite sides of said connecting web and a pair of flanges, each extending diagonally away from its associated recess at an angle substantially equal to the angle formed by the tapering sides of said A-shaped cross-section, said recesses forming self-energizing water pockets to cause the flange of the associated water pocket which may be filled with water to exert a greater compression force against an engaging surface of a pipe inserted through said gasket as a function of increasing water pressure applied upon said water pocket; and said annular member being formed from *a linear extrusion,* a length of said linear extrusion being curved and joined at its ends to form said annular [ring] *member.*

5. The gasket of claim 4 wherein the thickness of said connecting web is substantially less than the thickness of said neck portion to enhance the bending flexibility of said gasket.

6. Th gasket of claim 4 wherein each of said recesses has a curved concave surface portion to facilitate the intimate engagement of its associated [flap] *flange* with a pipe due to increasing water pressure.

7. A bidirectional gasket for use in forming a fluid-tight seal between a pipe and an opening in a barrier wall through which said pipe passes, comprising:

an annular member of elastomeric material having a substantially constant cross-section comprising a tubular head portion for engaging a pipe and a foot portion comprising a base flange portion and a neck portion of substantial thickness integrally joined to a mid region of said base flange portion to form a substantially T-shaped anchoring portion for embodiment within a case material forming said barrier [walls] *wall;* said head portion having tapering sides which are substantially symmetrical about a plane passing through a longitudinal axis of said head portion;

a connecting web extending between said neck portion of said foot portion and said head portion;

a pair of recesses provided in said head portion on opposite sides of said connection web for forming water pockets;

said head portion having a pair of integral legs extending away from said head portion in a generally radially outward direction, each leg and connecting web defining sides of an associated recess; and said water pockets serving as water-tight enhancing means urging the leg of the associated water pocket which may be filled with water to exert a greater compressive force against an engaging surface of a pipe inserted through said gasket as a function of increasing water pressure.

8. The gasket of claim 7 wherein the thickness of said connecting web is substantially less than the thickness of said neck portion and said head portion to enhance the bending flexibility of said gasket.

9. The gasket of claim 7 wherein the length of said legs is greater than the length of said connecting web, said lengths being measured generally along a line passing through the center of said connecting web.

10. The gasket of claim 7 wherein [the] ends of said legs engage the opening in said barrier wall, prior to insertion of a pipe, and are adapted to selectively engage the pipe when the gasket is deflected due to insertion of a pipe.

11. The gasket of claim 7 wherein [the] ends of said legs extend a small predetermined distance into annular recesses provided in the opening in said barrier wall and are adapted to selectively snap out of said recesses when the gasket is deflected due to insertion of a pipe.

12. The gasket of claim 7 wherein said legs substantially overlie said connecting web.

13. The gasket of claim 7 wherein said connecting web has a predetermined length, said recesses each having a depth substantially equal to the length of said connecting web.

* * * * *